US011698882B2

(12) United States Patent
Ichikawa

(10) Patent No.: US 11,698,882 B2
(45) Date of Patent: Jul. 11, 2023

(54) ELECTRONIC APPARATUS, CONTROL METHOD OF ELECTRONIC APPARATUS, AND CONTROL PROGRAM OF ELECTRONIC APPARATUS

(71) Applicant: CASIO COMPUTER CO., LTD., Tokyo (JP)

(72) Inventor: Yuichi Ichikawa, Kodaira (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 96 days.

(21) Appl. No.: 16/565,647

(22) Filed: Sep. 10, 2019

(65) Prior Publication Data

US 2020/0097435 A1 Mar. 26, 2020

(30) Foreign Application Priority Data

Sep. 20, 2018 (JP) ................................ 2018-175807

(51) Int. Cl.
*G06F 15/02* (2006.01)
*H04W 4/70* (2018.01)
(52) U.S. Cl.
CPC ........ *G06F 15/0208* (2013.01); *G06F 15/025* (2013.01); *G06F 15/0225* (2013.01); *H04W 4/70* (2018.02)
(58) Field of Classification Search
CPC ............. G06F 15/0208; G06F 15/0225; G06F 15/025; H04W 4/70

(Continued)

(56) References Cited

U.S. PATENT DOCUMENTS 5,901,074 A * 5/1999 Nakano ............... G06F 15/0225
708/142
2008/0301208 A1* 12/2008 Patton, Jr. ............ G06F 15/16
708/112

(Continued)

FOREIGN PATENT DOCUMENTS

CN    104933006 A    9/2015
CN    107229440 A    10/2017

(Continued)

OTHER PUBLICATIONS

Notice of Reasons for Refusal dated Aug. 23, 2022 received in Japanese Patent Application No. JP 2018-175807.

(Continued)

*Primary Examiner* — Dino Kujundzic
*Assistant Examiner* — Jianmei F Duckworth
(74) *Attorney, Agent, or Firm* — Scully, Scott, Murphy & Presser, P.C.

(57) ABSTRACT

According to one embodiment, there is provided an electronic apparatus comprises: a memory storing an instruction and configured to secure therein: a key transfer memory storage area configured to store at least a numerical value transferred from the external device; an entered numeral storage area configured to store a definitive entered numeral used for an arithmetic operation; and an entered numeral input area configured to store at least a numerical value input through a key input device for display; a processor configured to, in accordance with the instruction, cause the key transfer memory storage area to store a value transferred from the external device via a communication device, and then cause the entered numeral storage area and the entered numeral input area to store the value stored in the key transfer memory storage area.

9 Claims, 11 Drawing Sheets

(58) Field of Classification Search
USPC .......................................................... 708/130
See application file for complete search history.

(56) References Cited

U.S. PATENT DOCUMENTS

| | | | | |
|---|---|---|---|---|
| 2014/0172132 | A1* | 6/2014 | Ura | G06F 16/24568 |
| | | | | 700/90 |
| 2015/0269114 | A1* | 9/2015 | Muraki | G06F 15/0225 |
| | | | | 708/130 |
| 2017/0004108 | A1* | 1/2017 | Arikawa | G06F 15/0225 |
| 2017/0280272 | A1* | 9/2017 | Tanaka | H04L 67/26 |

FOREIGN PATENT DOCUMENTS

| | | |
|---|---|---|
| JP | S5916308 B2 | 4/1984 |
| JP | S60-139356 U | 9/1985 |
| JP | H01173253 A | 7/1989 |
| JP | H11-066012 A | 3/1999 |
| JP | H11102346 A | 4/1999 |
| JP | 3095252 U | 7/2003 |
| JP | 2017-174190 A | 9/2017 |

OTHER PUBLICATIONS

Notification of the First Office Action dated Jan. 9, 2023 received in Chinese Patent Application No. CN 201910870751.1.

* cited by examiner

| Storage step | Key input | Entered numeral input area | Entered numeral storage area | M independent memory storage area | Operator information area |
|---|---|---|---|---|---|
| (A) | 5 | 5 | 0 | 0 | |
| (B) | M+ | 5 | 5 | 5 | M+ |
| (C) | + | 5 | 5 | 5 | + |
| (D) | 3 | 3 | 5 | 5 | + |
| (E) | = | 8 | 8 | 5 | = |
| (F) | MR | 5 | 5 | 5 | MR |

| Storage step | Key/ smartphone input | Entered numeral input area | Entered numeral storage area | Key transfer memory storage area | Operator information area |
|---|---|---|---|---|---|
| (A) | 1234 | 0 | 0 | 0 | |
| (B) | | 1234 | 0 | 0 | |
| (C) | | 1234 | 0 | 1234 | |
| (D) | | 1234 | 1234 | 1234 | |
| (E) | + | 1234 | 1234 | 1234 | + |
| (F) | 5 | 5 | 1234 | 1234 | + |
| (G) | 6 | 56 | 1234 | 1234 | + |
| (H) | = | 1290 | 1290 | 1234 | = |

FIG. 7

| Storage step | Key/ smartphone input | Entered numeral input area | Entered numeral storage area | Key transfer memory storage area | Operator information area |
|---|---|---|---|---|---|
| (A) | 1234 | 0 | 0 | 0 | |
| (B) | | 1234 | 0 | 0 | |
| (C) | | 1234 | 0 | 1234 | |
| (D) | | 1234 | 1234 | 1234 | |
| (E) | 5 | 5 | 1234 | 1234 | |
| (F) | 6 | 56 | 1234 | 1234 | |
| (G) | = | 56 | 56 | 1234 | = |

FIG. 8

| Storage step | Key/ smartphone input | Entered numeral input area | Entered numeral storage area | Key transfer memory storage area | Reference date storage area |
|---|---|---|---|---|---|
| (A) |  | 0 | 0 | Clear | Clear |
| (B) | 1057 | 1057 | 0 | 0 | 0 |
| (C) |  | 1057 | 0 | 1057 | 0 |
| (D) |  | 1057 | 1057 | 1057 | 0 |
| (E) | − | 1057− | 1057− | 1057 | 0 |
| (F) | 7 | 7 | 1057− | 1057 | 0 |
| (G) | 5 | 75 | 1057− | 1057 | 0 |
| (H) | = | 982 | 982 | 1057 | 0 |
| (I) | 2017-9-1 | 982 | 982 | 1057 | 2017-9-1 |
| (J) |  | 2020-5-10 | 2020-5-10 | 1057 | 2017-9-1 |

FIG. 12

ELECTRONIC APPARATUS, CONTROL METHOD OF ELECTRONIC APPARATUS, AND CONTROL PROGRAM OF ELECTRONIC APPARATUS

CROSS-REFERENCE TO RELATED APPLICATIONS

This application is based upon and claims the benefit of priority from prior Japanese Patent Application No. 2018-175807, filed Sep. 20, 2018, the entire contents of which are incorporated herein by reference.

TECHNICAL FIELD

The technical field relates to an electronic apparatus, and a control method of the electronic apparatus, and a control program of the electronic apparatus.

DESCRIPTION OF RELATED ART

Hardware keys are provided on, for example, an electronic calculator (hereinafter referred to as a calculator) disclosed in Jpn. Pat. Appln. KOKAI Publication No. 11-66012. The hardware keys are user-friendly as to input, for example, prevent mistyping of a key, allow a user to easily get feeling of pressing, and facilitate touch typing.

On the other hand, in recent years, a smart device (external device) such as a smart phone, has been in widespread use, and calculator software has been provided as application software of the smart device.

In general, the smart device has a problem that input is difficult due to the absence of hardware keys. As a solution to the problem, it is conceivable to use, as an input device of the smart device, an electronic apparatus, such as a calculator, including hardware keys. In this case, if the processing result of the smart device can be fed back to the electronic apparatus, and the electronic apparatus can take over an operation using the processing result of the smart device, the electronic apparatus can be used as not only an input device, but also a device having an improved utility value.

For example, it is conceivable that the calculator receives a processing result such as an arithmetic operation result transferred from the smart device, and performs a further arithmetic operation on the received processing result.

The present invention is intended to provide an electronic apparatus for providing a correct arithmetic operation result based on data obtained from an external device, a control method of the electronic apparatus, and a control program of the electronic apparatus.

BRIEF SUMMARY

According to one embodiment, there is provided an electronic apparatus includes: a display; a key input device comprising an input key; a communication device for communication with an external device; a memory storing an instruction and configured to secure therein: a key transfer memory storage area configured to store at least a numerical value transferred from the external device; an entered numeral storage area configured to store a definitive entered numeral used for an arithmetic operation; and an entered numeral input area configured to store at least a numerical value input through the key input device for display; a processor configured to, in accordance with the instruction, cause the key transfer memory storage area to store a value transferred from the external device via the communication device, and then cause the entered numeral storage area and the entered numeral input area to store the value stored in the key transfer memory storage area.

According to another embodiment, there is provided an display method performed by a processor of an electronic apparatus, the method includes: causing a key transfer memory storage area of a memory of the electronic apparatus to store a value transferred from an external device via a communication device of the electronic apparatus, then causing an entered numeral storage area and entered numeral input area of the memory to store the value stored in the key transfer memory storage area, the key transfer memory storage area being configured to store at least a numerical value transferred from the external device, the entered numeral storage area being configured to store a definitive entered numeral used for an arithmetic operation, and the entered numeral input area being configured to store at least a numerical value input through a key input device of the electronic apparatus for display; and causing a display of the electronic apparatus to display the value stored in the entered numeral input area.

According to another embodiment, there is provided a non-transitory computer-readable recording medium according to the present invention, the non-transitory computer-readable recording medium with an executable program stored thereon, wherein the program instructs a computer to: cause a key transfer memory storage area of a memory of an electronic apparatus to store a value transferred from an external device via a communication device of the electronic apparatus, then cause an entered numeral storage area and entered numeral input area of the memory to store the value stored in the key transfer memory storage area, the key transfer memory storage area being configured to store at least a numerical value transferred from the external device, the entered numeral storage area being configured to store a definitive entered numeral used for an arithmetic operation, and the entered numeral input area being configured to store at least a numerical value input through a key input device of the electronic apparatus for display; and cause a display of the electronic apparatus to display the value stored in the entered numeral input area.

BRIEF DESCRIPTION OF THE DRAWINGS

The components in the drawings are not necessarily to scale relative to each other.

FIG. 7 is a diagram illustrating a procedure for storing data in each area of the memory of the calculator in response to received data from the smartphone and input data from the key input device of the calculator.

FIG. 8 is a diagram illustrating a procedure for storing data in each area of the memory of the calculator in response to received data from the smartphone and input data from the key input device of the calculator.

FIG. 12 is a diagram illustrating a procedure for storing data in each area of the memory of the calculator in response to received data from the smartphone and input data from the key input device of the calculator.

DETAILED DESCRIPTION

Embodiments of the present invention will be described with reference to the drawings. In some drawings, the members are partly omitted for clarification.

First Embodiment

Figure 1:
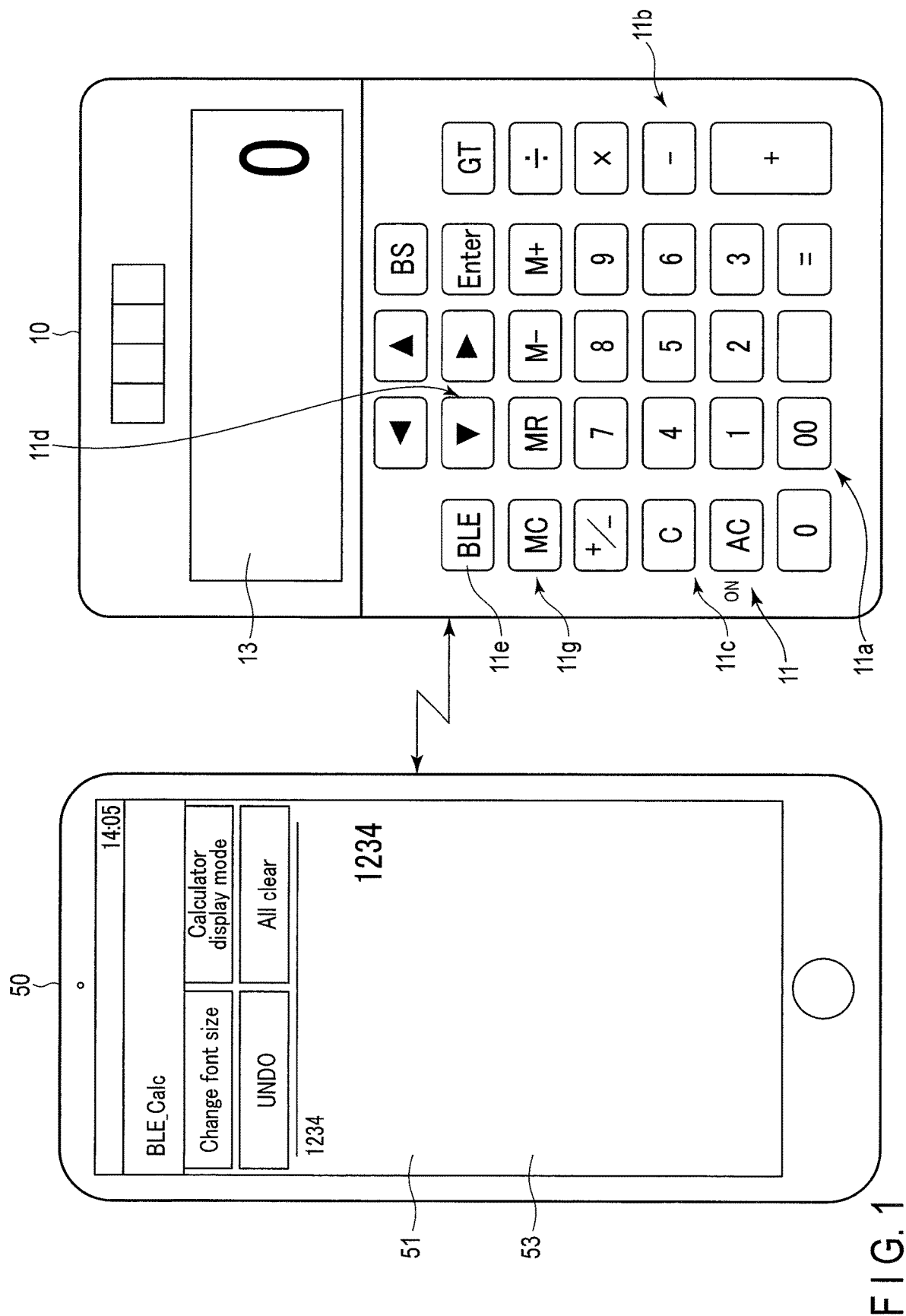
FIG. 1 is a front view showing an exterior configuration of each of a calculator as an electronic apparatus according to a first embodiment and a smartphone that performs data communication with the calculator.

Hereinafter, a first embodiment will be described. FIG. 1 is a front view showing an exterior configuration of each of an electronic calculator (hereinafter referred to as a calculator 10) as an electronic apparatus and a smartphone 50 that performs data communication with the calculator 10.

The calculator 10 performs data communication with the smartphone 50 by using, for example, near field communication technology, such as Bluetooth (registered trademark) Low Energy (hereinafter, referred to as BLE). The calculator 10 is an example of an electronic apparatus capable of data communication, and another device having hardware keys and a calculation function may be used instead of the calculator 10. The smartphone 50 is an example of a smart device capable of data communication, and a tablet terminal or the like may be used instead of the smartphone 50.

A key input device 11 and a display 13 are provided on the front surface of the body of the calculator 10.

The key input device 11 includes a hardware key group including, for example, a numeric key 11a, an operation key 11b, a first function key 11c, and a second function key 11d.

The numeric key 11a includes a plurality of keys corresponding to, for example, [00] and [0] to [9], respectively. The operation key lib includes a plurality of keys corresponding to, for example, [+] (addition), [−] (subtraction), [X] (multiplication), [÷] (division), and [=] (equal), respectively. The first function key 11c includes, for example, an all clear key ([AC] key), a clear key ([C] key), and a plurality of memory keys 11g ([MC], [MR], [M+], and [M−]) relating to memory functions, and a grand total key ([GT]). The second function key 11d includes a BLE key 11e operated for the calculator 10 to be in synchronization with the smartphone 50 when the calculator 10 performs data communication with the smartphone 50 by means of BLE, a plurality of cursor keys (an up key, a down key, a left key, and a right key) corresponding to the respective directions of up, down, left, and right, a backspace ([BS]) key, and an enter key ([Enter]).

Those keys have a press (stroke) key structure for, when being depressed by a user's pressing operation, inputting a content indicated (printed) on the key top into an arithmetic processing system in the calculator 10.

The display 13 is constituted by a dot-matrix or segment (e.g., seven-segment)-type liquid crystal display unit. The display 13 displays, for example, a numerical value and operator input by depression operations on the numeric key 11a and operation key 11b, a symbol (M) corresponding to the memory key 11g, a symbol (GT) corresponding to the grand total key, and a symbol (BLE) indicating that the calculator 10 is connected to the smartphone 50 by BLE.

A touch panel 51 for inputting information such as a numerical value and a character into the smartphone 50, and a display 53 to display information input through the touch panel 51 are provided on the front surface of the body of the smartphone 50. The touch panel 51 is mounted on the display 53.

Figure 2:
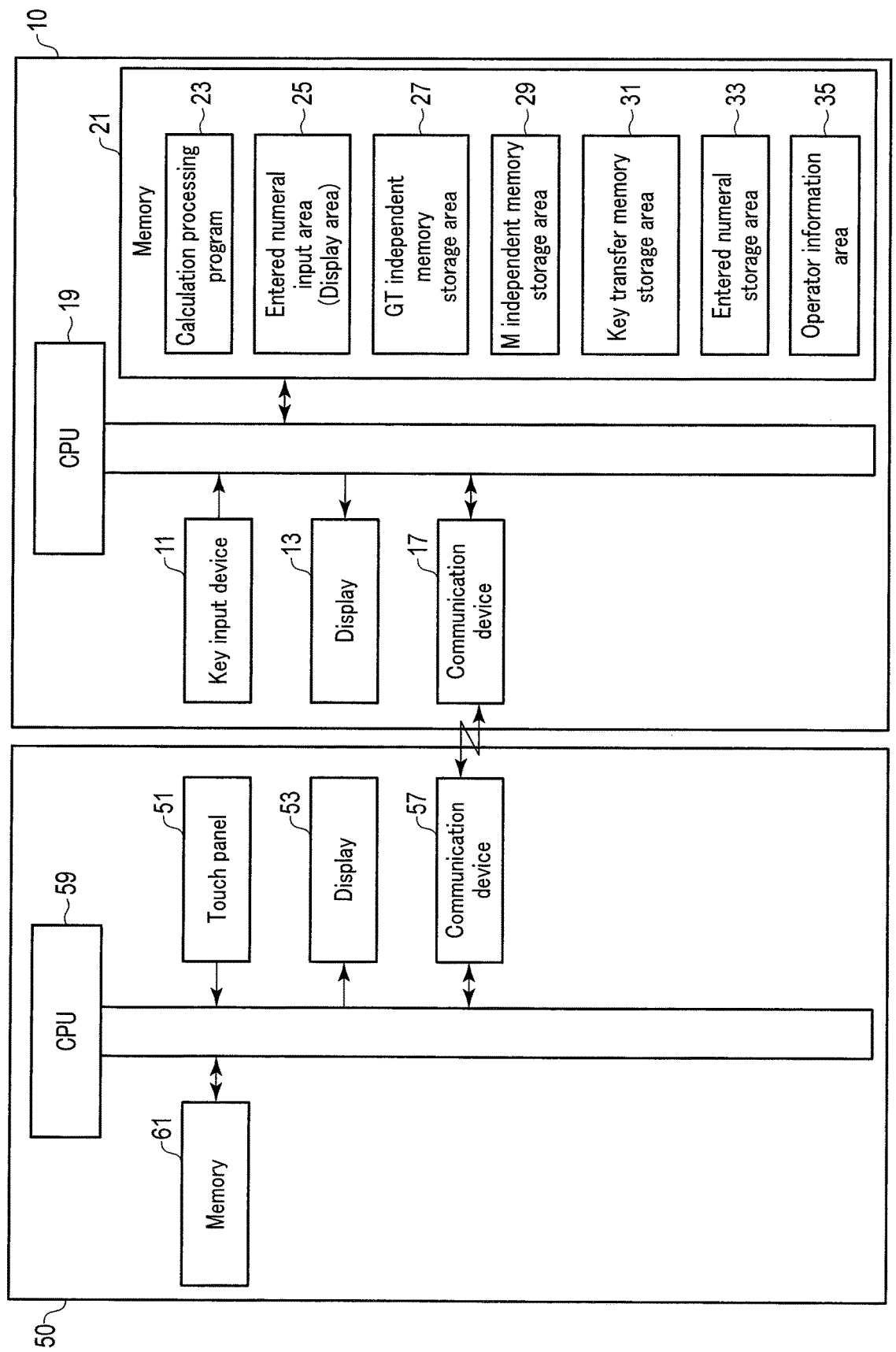
FIG. 2 is a block diagram showing a configuration of an electronic circuit of each of the calculator and smartphone shown in FIG. 1.

FIG. 2 is a block diagram showing a configuration of the electronic circuit of each of the calculator 10 and smartphone shown 50 in FIG. 1.

The electronic circuit of each of the calculator 10 and the smartphone 50 includes a plurality of units including a communication device 17, 57, a central processing unit (CPU) 19, 59, which is a processor constituting a computer, and a memory 21, 61. The units of the calculator 10 also include the above-described key input device 11 and display 13, and the units of the smartphone 50 also include the above-described touch panel 51 and display 53.

The communication device 17 of the calculator 10 is a communication interface for performing wireless data communication with the communication device 57 of the smartphone 50 by means of BLE when the BLE key 11e is depressed. The communication devices 17 and 57 may perform data communication via a server on a communication network (including the Internet, etc.). If the communication device 17 only has a wired serial communication function, wireless data communication may be enabled by connecting a BLE unit to the communication device 17 and performing communication via the BLE unit.

The CPU 19 of the calculator 10 executes a calculation processing program 23 stored in the memory 21 of the calculator 10 to control the operation of each unit of the circuit, thereby performing various types of arithmetic processing in response to inputs from the key input device 11. In the calculation processing program 23, for example, a variable or the like used to make a so-called symbol display of an operator on the display 13 is set, and a symbol or the like corresponding to the type of the operator input through the key input device 11 can be displayed on the display 13 by the CPU 19.

The calculation processing program 23 is stored in the memory 21 in advance; however, it may be stored in the memory 21 by being downloaded from the smartphone 50 via the communication device 17 or from a server on a communication network. Alternatively, the calculation processing program 23 may be stored in the memory 21 by being read from an external storage medium such as a memory card via a storage medium reading device (not shown).

An entered numeral input area 25, a GT independent memory storage area 27, an M independent memory storage area 29, a key transfer memory storage area 31, an entered numeral storage area 33, and an operator information area 35 are secured in the memory 21.

The entered numeral input area 25 is an area to store a value (numerical value) to be displayed on the display 13. When the numeric key 11a is depressed, a key code (numeric code) indicating the numerical value indicated on the key top of the numeric key 11*a* is stored in the entered numeral input area 25 as one element.

The GT independent memory storage area 27 stores a numerical value displayed on the display 13 by the operation of the [GT] key.

The M independent memory storage area 29 is an area to store, in response to a depression of the memory key 11*g* ([M+] or [M−] key, which is a memory storage key), a result of an arithmetic operation on the numerical value already stored in the M independent memory storage area 29 and the numerical value stored in the entered numeral input area 25 when the memory key 11*g* is depressed. When the memory key 11*g* ([M+] or [M−] key) is depressed, a numerical value obtained by performing an arithmetic operation (addition or subtraction) on the numerical value already stored in the M independent memory storage area 29 and the numerical value stored in the entered numeral input area 25 is stored in the M independent memory storage area 29 in an overwriting manner.

The key transfer memory storage area 31 is an area to store data transferred from the smartphone 50 when a predetermined condition is satisfied. When a value (numerical value) is transferred from the smartphone 50, the value (numerical value) is stored in the key transfer memory storage area 31 if a predetermined condition is satisfied. When data is transferred from the smartphone 50 and a predetermined condition is satisfied, the key transfer memory storage area 31 is used as an area corresponding to the M independent memory storage area 29.

The entered numeral storage area 33 stores a definitive entered numeral (numerical value) used for an arithmetic operation.

The operator information area 35 stores an operator used for an arithmetic operation.

The CPU 59 of the smartphone 50 executes a calculation processing program stored in the memory 61 of the calculator 50 to control the operation of each unit of the circuit, thereby performing various types of arithmetic processing in response to inputs from the touch panel 51.

Figure 3A:
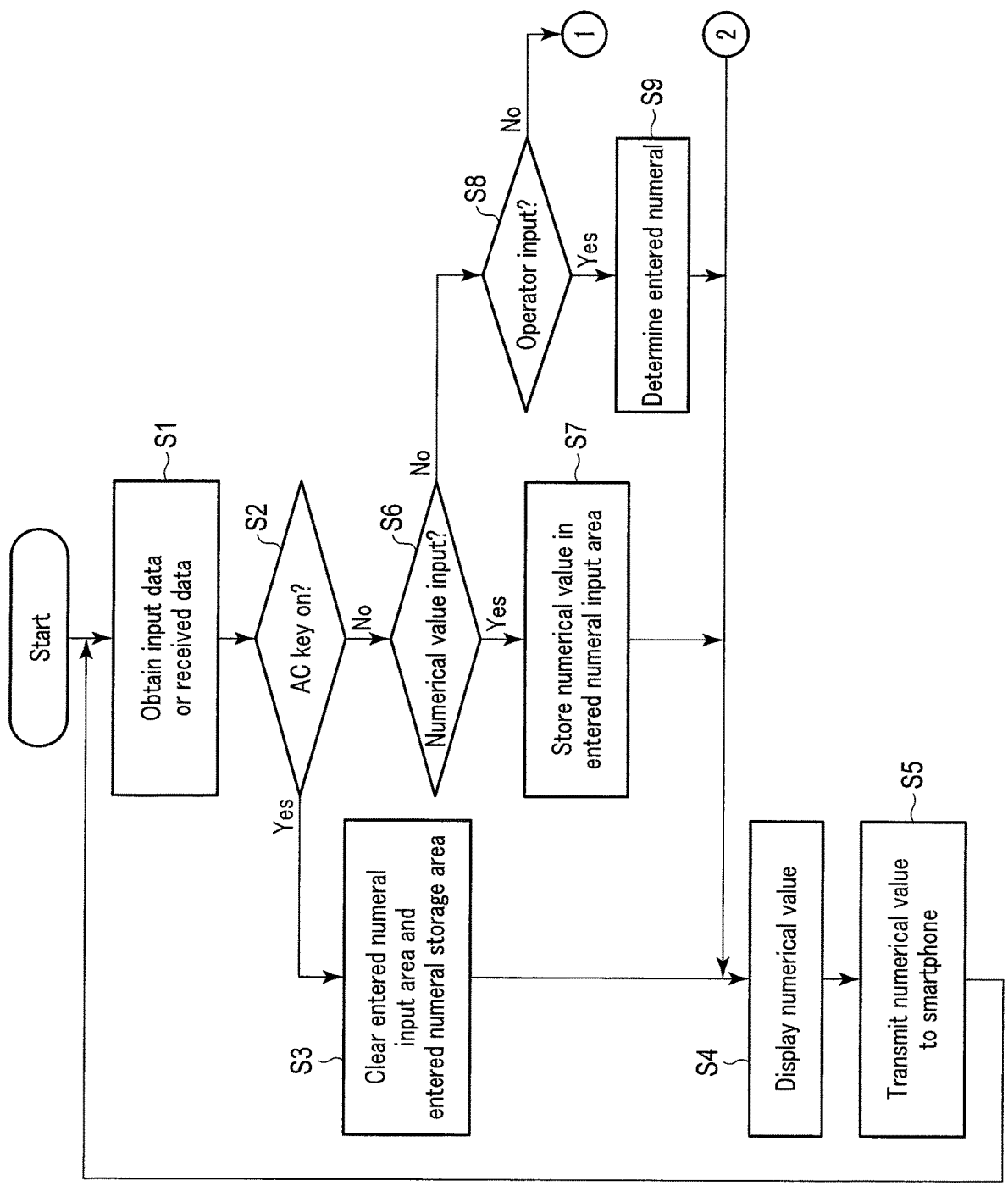
FIG. 3A is a flowchart showing an operation of the calculator.
Figure 3B:
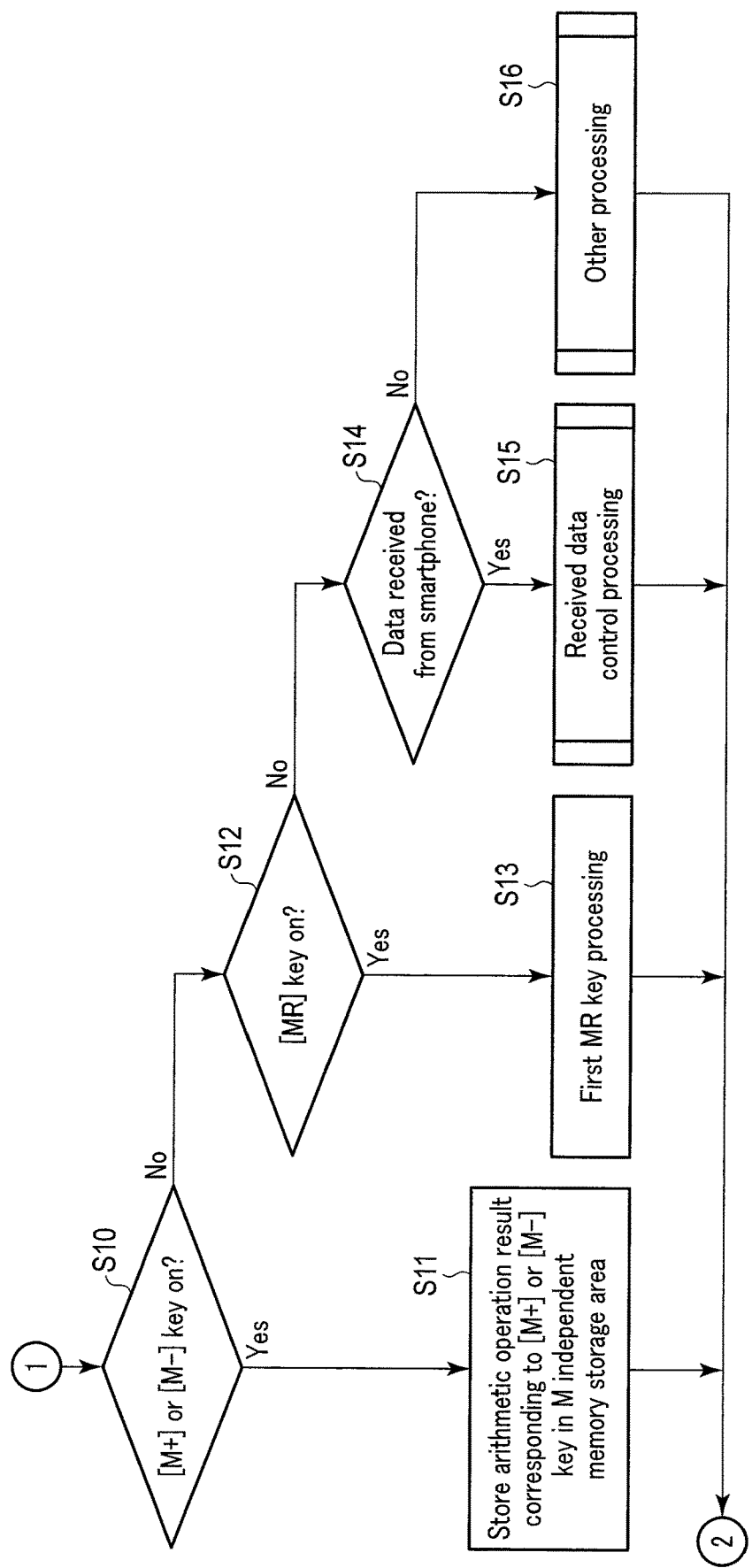
FIG. 3B is a flowchart showing the operation of the calculator.

Next, an operation of the calculator 10 in the present embodiment will be described. FIGS. 3A and 3B are a flowchart showing an operation of the calculator 10. Here, the CPU 19 of the calculator 10 obtains input data input through the key input device 11 or received data transferred from the smartphone 50, and performs the processing to be described layer in accordance with the type of the obtained data (for example, a numerical value, an operator, information of a memory function, or data received from a smartphone). In response to one depression of the BLE key 11*e*, the calculator 10 is brought into synchronization with the smartphone 50 during the operation.

In step S1, the CPU 19 obtains input data input through the key input device 11 or received data transferred from the smartphone 50. The obtained data is retained in a data temporal storage, such as a key input buffer or receive buffer (not shown). The input data herein is a value (numerical value) or operator indicated on the key top of the key input device 11 (for example, "1", "+", "AC", [M+], or [BS]). Namely, the input data is information of various functions, such as a numerical value, an operator, "AC", [M+], and [BS]. The received data is, for example, a numerical value or an operator.

In step S2, the CPU 19 checks whether or not the AC key has been depressed. When determining that the AC key has been depressed in step S2, the CPU 19 proceeds to step S3. In step S3, the CPU 19 clears (erases) data stored in each of the entered numeral input area 25 and the entered numeral storage area 33. Accordingly, the numeral input area 25 and the numeral storage area 33 are placed in the state of storing "0". In step S4, the CPU 19 causes the display 13 to display the numerical value stored in the entered numeral input area 25 ("0" in this case). In step S5, the CPU 19 transmits the numerical value ("0" in this case) stored in the entered numeral input area 25 to the smartphone 50 via the communication device 17. Then, the CPU 19 proceeds to step S1.

When determining that the AC key has not been depressed in step S2, the CPU 19 proceeds to step S6. In step S6, the CPU 19 checks whether the data obtained in step S1 is a numerical value input by a depression of the numeric key 11*a*.

When determining that the input data is a numerical value in step S6, the CPU 19 proceeds to step S7. In step S7, the CPU 19 causes the entered numeral input area 25 to store the data (numerical value) obtained in step S1. Then, the CPU 19 proceeds to step S4. In this case, the numerical value stored in the entered numeral input area 25 is displayed on the display 13 in step S4, and is transmitted to the smartphone 50 via the communication device 17 in step S5.

When determining that the input data is not a numerical value in step S6, the CPU 19 proceeds to step S8. In step S8, the CPU 19 checks whether the data obtained in step S1 is an operator input by a depression of the operation key 11*b*.

When determining that the input data is an operator in step S8, the CPU 19 proceeds to step S9. Details of step S9 will be described below.

In step S9, the CPU 19 stores the input operator in the operator information area 35. The CPU 19 performs entered numeral determination processing in accordance with the type of the operator as described below. In the following description, "+", "−", "×", "÷", and "=" will be taken as examples of the types of the operator.

When an operator (one of "+", "−", "×", "÷", and "=") is input, the CPU 19 performs an arithmetic operation on the entered numeral already stored in the entered numeral storage area 33 and the value stored in the entered numeral input area 25, and causes the entered numeral storage area 33 to store the arithmetic operation result as a new entered numeral.

When the type of the operator is one of "+", "−", "×", and "÷", the CPU 19 allows the entered numeral input area 25 to continuously store the numerical value already stored therein. Then, the CPU 19 proceeds to step S4. In this case, there is no change in the numerical value stored in the entered numeral input area 25; therefore, the numerical value displayed on the display 13 is not changed in step S4. In step S4, the operator is additionally displayed (i.e., a so-called symbol display is made) on the display 13. In step S5, data on the operator is transmitted to the smartphone 50.

In contrast, when the type of the operator is "=", the CPU 19 causes the entered numeral input area 25 to store the same value as the arithmetic operation result (new entered numeral) stored in the entered numeral storage area 33. Then, the CPU 19 proceeds to step S4. In this case, the numerical value stored in the entered numeral input area 25 is changed to the arithmetic operation result, and the numerical value displayed on the display 13 is changed to the arithmetic operation result in step S4. In step S5, data on the arithmetic operation result and the operator is transmitted to the smartphone 50.

When determining that the input data is not an operator in step S8, the CPU 19 proceeds to step S10. In step S10, the CPU 19 checks whether the data obtained in step S1 is an input of a memory registration function (one of the memory functions) made by a depression of the [M+] key or [M−] key of the memory key 11g.

When determining that the [M+] key or [M−] key, which is a memory storage key, has been depressed in step S10, the CPU 19 proceeds to step S11. In step S11, the CPU 19 causes the M independent memory storage area 29 to store an arithmetic operation result corresponding to the [M+] key or [M−] key. Details of step S11 will be described below.

In step S11, the CPU 19 performs an arithmetic operation (addition or subtraction) corresponding to the memory key 11g ([M+] or [M−] key) on the numerical value stored in the M independent memory storage area 29 with the numerical value stored in the entered numeral input area 25, and causes the M independent memory storage area 29 to store the arithmetic operation result. The CPU 19 also causes the entered numeral storage area 33 to store the numerical value stored in the entered numeral input area 25. The CPU 19 causes the operator information area 35 to store the input information ([M+] or [M−]) of the memory registration function. Then, the CPU 19 proceeds to step S4. In this case, of the data stored in the entered numeral input area 25, the numerical value is not changed; therefore, the display of the display 13 is not changed in step S4, and data is not transmitted to the smartphone 50 in step S5. In step S4, it is also possible to make a display (so-called symbol display) indicating that the numerical value has been stored, and inform the smartphone 50 accordingly.

When determining that the [M+] key or [M−] key has not been depressed in step S10, the CPU 19 proceeds to step S12. In step S12, the CPU 19 checks whether the data obtained in step S1 is an input of a memory read function (one of the memory functions) made by a depression of the [MR] key, which is a memory read key of the memory key 11g.

When determining that the [MR] key has been depressed in step S12, the CPU 19 proceeds to step S13. In step S13, the CPU 19 performs first MR key processing. In the first MR key processing, the CPU 19 causes the entered numeral input area 25 and the entered numeral storage area 33 to store the numerical value stored in the M independent memory storage area 29. Then, the CPU 19 proceeds to step S4. In this case, the numerical value stored in the entered numeral input area 25 is displayed on the display 13 in step S4, and is transmitted to the smartphone 50 via the communication device 17 in step S5.

Figures 4, 5:
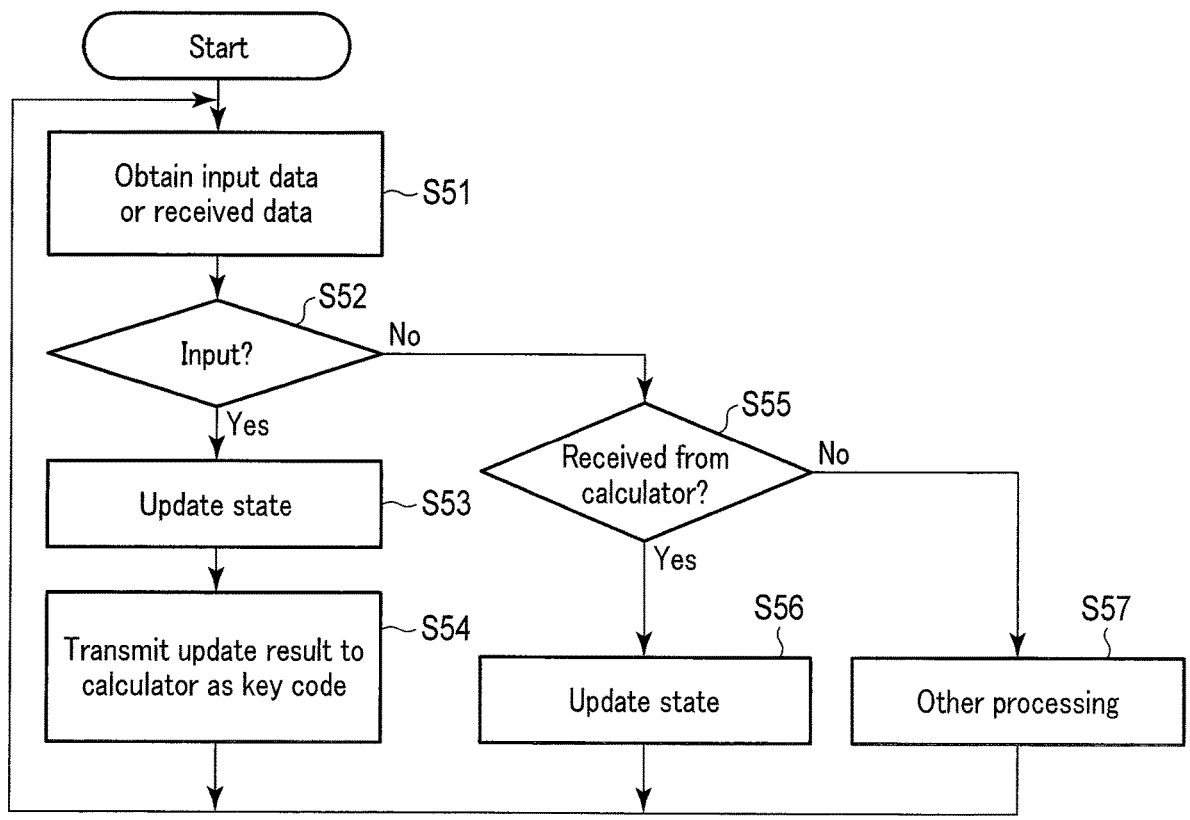
FIG. 4 is a diagram illustrating a procedure for storing data in each area of a memory of the calculator in response to input data from a key input device of the calculator.
FIG. 5 is a flowchart showing an operation of the smartphone.

A procedure for storing data in each area of the memory 21 in response to input data from the key input device 11 which is performed by the above-described step S1 to step S13 will be described while taking an example. FIG. 4 shows data stored in each area when the keys "5", "M+", "+", "3", "=", and "MR" of the key input device 11 are depressed in order. Let us assume that the entered numeral input area 25, the entered numeral storage area 33, and the M independent memory storage area 29 have been cleared (erased) and store "0" in the initial state. Let us also assume that the operator information area 35 stores no data in the initial state.

In storage step (A) shown in FIG. 4, when the "5" key of the numeric key 11a is depressed, the CPU 19 obtains the input data (step S1), determines that a numerical value has been input (Yes in step S6), and causes the entered numeral input area 25 to store the numerical value "5" (step S7).

In storage step (B) shown in FIG. 4, when the "M+" key of the memory key 11g is depressed, the CPU 19 obtains the input data (step S1), determines that a memory function "M+" has been input (Yes in step S10), causes the operator information area 35 to store the memory function "M+", adds the numerical value "5" stored in the entered numeral input area 25 to the numerical value "0" stored in the M independent memory storage area 29, and causes the entered numeral storage area 33 and the M independent memory storage area 29 to store the arithmetic operation result "5" (step S11). The entered numeral input area 25 still stores "5".

In storage step (C) shown in FIG. 4, when the "+" key of the operation key 11b is depressed, the CPU 19 obtains the input data (step S1), determines that an operator has been input (Yes in step S8), and causes the operator information area 35 to store the operator "+" (step S9). The entered numeral input area 25, the entered numeral storage area 33, and the M independent memory storage area 29 still store "5", "5", and "5", respectively.

In storage step (D) shown in FIG. 4, when the "3" key of the numeric key 11a is depressed, the CPU 19 obtains the input data (step S1), determines that a numerical value has been input (Yes in step S6), and causes the entered numeral input area 25 to store the numerical value "3" (step S7). The entered numeral storage area 33, the M independent memory storage area 29, and the operator information area 35 still store "5", "5", and "+", respectively.

In storage step (E) shown in FIG. 4, when the "=" key of the operation key 11b is depressed, the CPU 19 obtains the input data (step S1), determines that an operator has been input (Yes in step S8), causes the operator information area 35 to store the operator "=", performs an arithmetic operation on the entered numeral ("5") stored in the entered numeral storage area 33 and the numerical value "3" stored in the entered numeral input area 25 to obtain the arithmetic operation result "8", and causes the entered numeral input area 25 and the entered numeral storage area 33 to store the arithmetic operation result "8" (step S9). The M independent memory storage area 29 still stores "5".

In storage step (F) shown in FIG. 4, when the "MR" key, which is a memory read key of the memory key 11g, is depressed, the CPU 19 obtains the input data (step S1), determines that the memory function "MR" has been input (Yes in step S12), causes the operator information area 35 to store the memory function "MR", and causes the entered numeral input area 25 and the entered numeral storage area 33 to store "5" stored in the M independent memory storage area 29 (step S13). The M independent memory storage area 29 still stores "5".

Next, an operation of the smartphone 50 performed when the calculator 10 transmits a numerical value to the smartphone 50 in step S5 will be described. FIG. 5 is a flowchart showing an operation of the smartphone 50.

In step S51, the CPU 59 obtains input data input through the touch panel 51 or received data transferred from the calculator 10. The input data herein is, for example, a numerical value or an operator. The received data is, for example, a value (numerical value) displayed on the display 13 of the calculator 10.

In step S52, the CPU 59 checks whether the data obtained in step S51 is data input through the touch panel 51. When determining that the obtained data is data input through the touch panel 51 in step S52, the CPU 59 proceeds to step S53. In step S53, the CPU 59 updates the state of the smartphone 50. For example, the CPU 59 causes the memory 61 to store the input data from the touch panel 51, and causes the display 53 to reflect the input data. The input data may be a numerical value or an instruction to perform given processing, such as arithmetic processing. When the input data is an instruction to perform given processing, the CPU 59 can cause the memory 61 to store data of the processing result, and cause the display 53 to reflect the data of the processing result. In step S54, the CPU 59 transfers the update content (input data or processing result data) to the calculator 10 via the communication device 57 as a key code. Accordingly, step S1 is performed in the calculator 10. Then, the CPU 59 returns to step S51.

When determining that the obtained data is not data input through the touch panel 51 in step S52, the CPU 59 proceeds to step S55. In step S55, the CPU 59 checks whether the data obtained in step S51 is data received from the calculator 10.

When determining that the obtained data is data received from the calculator 10 in step S55, the CPU 59 proceeds to step S56. In step S56, the CPU 59 updates the state of the smartphone 50. For example, the CPU 59 causes the memory 61 to store the received data, and causes the display 53 to reflect the received data. Then, the CPU 59 returns to step S51.

When determining that the obtained data is not data received from the calculator 10 in step S55, the CPU 59 proceeds to step S57. In step S57, the CPU 59 performs other processing. For example, the CPU 59 performs processing to change the font size of the value displayed on the display 53, processing to cause the display 53 to display a key arrangement of the calculator by changing the use mode of the smartphone 50 to a calculator mode, processing to change the display content of the display 53 from the first content currently displayed back to the second content displayed before the first content, or processing to clear the input data and received data already stored in the memory 61. Then, the CPU 59 returns to step S51.

Referring back to FIG. 3B, the subsequent part of the operation of the calculator 10 will be described. When determining that the [MR] key has not been depressed in step S12, the CPU 19 proceeds to step S14. In step S14, the CPU 19 checks whether the data obtained in step S1 is received data transferred from the smartphone 50 in step S54. When determining that the obtained data is data received from the smartphone 50 in step S14, the CPU 19 proceeds to step S15. In step S15, the CPU 19 performs received data control processing to be described later. Then, the CPU 19 returns to step S4.

When determining that the obtained data is not data received from the smartphone 50 in step S14, the CPU 19 proceeds to step S16. In step S16, the CPU 19 performs other processing. For example, in response to a depression of the [GT] key of the memory key 11g, the CPU 19 causes the entered numeral input area 25 and the entered numeral storage area 33 to store the numerical value stored in the GT independent memory storage area 27.

Figure 6:
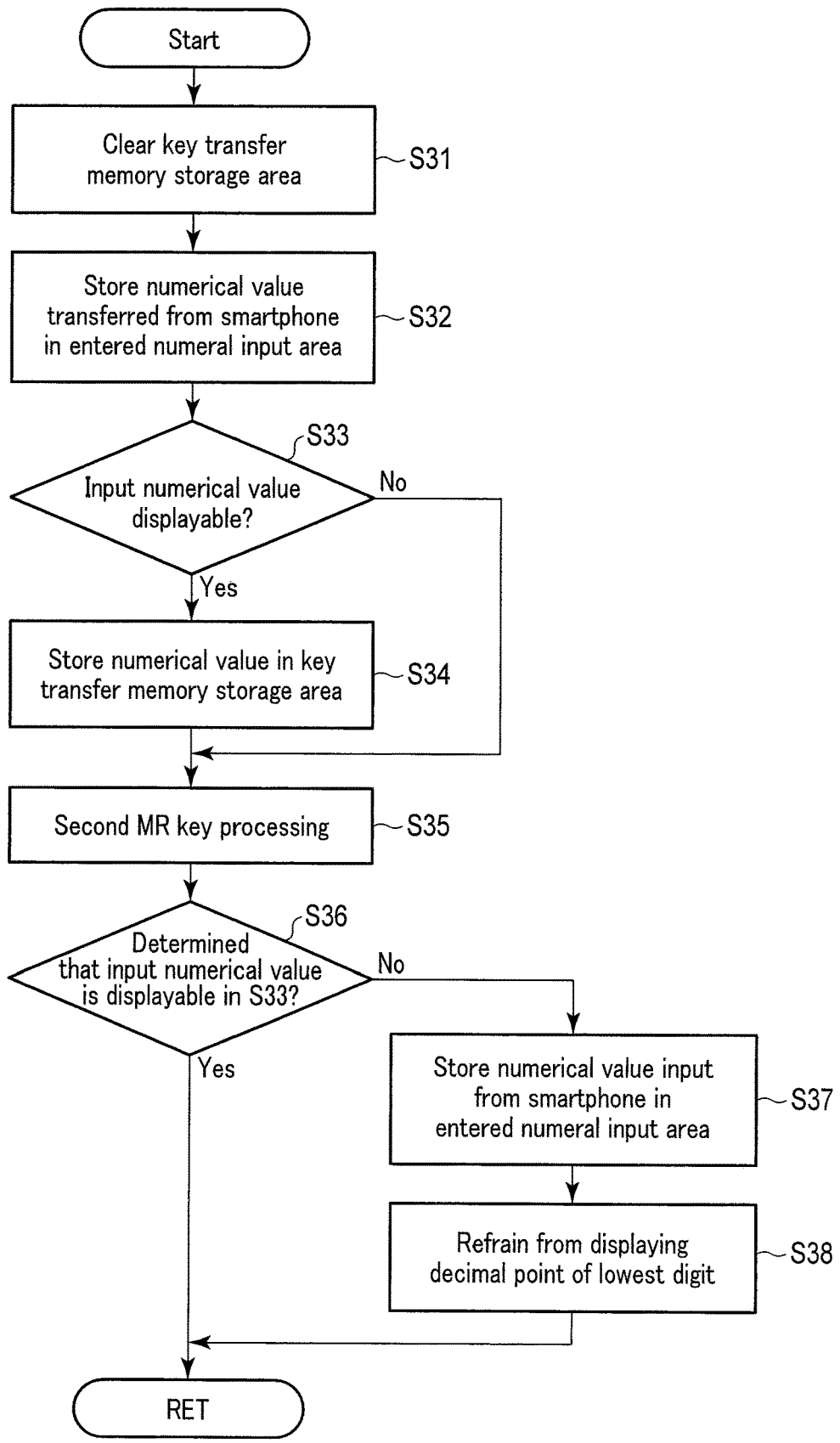
FIG. 6 is a flowchart showing received data control processing.

Next, the received data control processing of step S15 will be described. FIG. 6 is a flowchart showing the received data control processing. Here, a description will be provided on the assumption that the received data is, for example, a numerical value.

In step S31, the CPU 19 clears (erases) the numerical value already stored in the key transfer memory storage area 31. Accordingly, the key transfer memory storage area 31 is placed in the state of storing "0".

In step S32, the CPU 19 causes the entered numeral input area 25 to temporarily store a numerical value that is the received data transferred from the smartphone 50.

In step S33, the CPU 19 checks whether the display 13 can display the numerical value stored in the entered numeral input area 25. For example, the CPU 19 checks whether the number of digits of the numerical value is a number that can be displayed.

When determining that the display 13 can display the numerical value stored in the entered numeral input area 25 in step S33, the CPU 19 proceeds to step S34. In step S34, the CPU 19 causes the key transfer memory storage area 31 to store the numerical value stored in the entered numeral input area 25. Namely, in step S34, "0" stored in the key transfer memory storage area 31 in step S31 is overwritten with the numerical value sored in the entered numeral input area 25 in step S32. Then, the CPU 19 proceeds to step S35.

When determining that the display 13 cannot display the numerical value stored in the entered numeral input area 25 in step S33, the CPU 19 proceeds to step S35. When the CPU 19 proceeds from step S33 to step S35, the numerical value stored in the entered numeral input area 25 is not stored in the key transfer memory storage area 31, and the key transfer memory storage area 31 still stores "0".

In step S35, the CPU 19 performs second MR key processing. In the second MR key processing, the CPU 19 causes the entered numeral storage area 33 to store the numerical value stored in the key transfer memory storage area 31 as an entered numeral, and causes the entered numeral input area 25 to store the same. Namely, when the processing proceeds in the order of step S33, step S34, and step S35, the numerical value transferred from the smartphone 50 is stored in the entered numeral input area 25 and then in the key transfer memory storage area 31, and subsequently stored in the entered numeral storage area 33 and the entered numeral input area 25. When the processing proceeds in the order of step S33 and step S35 without performing step S34, the numerical value stored in the entered numeral input area 25 is not transferred to the key transfer memory storage area 31, and "0" stored in the key transfer memory storage area 31 is stored in the entered numeral storage area 33 and the entered numeral input area 25. Here, the expression "stored in the entered numeral input area 25" in step S35 means that the numerical value already stored in the entered numeral input area 25 is overwritten with the numerical value stored in the key transfer memory storage area 31. Then, the CPU 19 proceeds to step S36.

In step S36, the CPU 19 checks whether the CPU 19 determined that the display 13 can display the numerical value stored in the entered numeral input area 25 in step S33. When determining that the CPU 19 determined that a display can be made, the CPU 19 terminates the received data control processing of step S15, and returns to step S4. When determining that the CPU 19 determined that a display cannot be made, the CPU 19 proceeds to step S37.

In step S37, the CPU 19 causes the entered numeral input area 25 again to store the numerical value received from the smartphone 50 and retained in step S1 without processing the numerical value. In step S38, the CPU 19 sets the display operation of the display 13 so that the display 13 refrains from displaying the decimal point of the lowest digit, and terminates the received data control processing of step S15. Thereafter, the CPU 19 returns to step S4, and operates the display 13 in accordance with the set display operation of the display 13.

A procedure for storing data in each area of the memory 21 in response to received data from the smartphone 50 and input data from the key input device 11 will be described while taking an example. Storage steps (A) to (D) in FIG. 7 indicate data stored in each area when a storage procedure in the received data control processing of step S15 is performed, in particular, when "1234" is input from the smartphone 50 as a numerical value. Storage steps (E) to (H) in FIG. 7 indicate data stored in each area when the keys "+", "5", "6", and "=" are depressed in order on the key input device 11. Let us assume that the entered numeral input area 25 and the entered numeral storage area 33 store "0" in the initial state. Let us also assume that the key transfer memory storage area 31 stores a predetermined value (numerical value) in the initial state. Let us also assume that the operator information area 35 stores no data in the initial state.

In the calculator 10, upon receipt of the numerical value data "1234" from the smartphone 50 (Yes in step S14), the CPU 19 clears the numerical value stored in the key transfer memory storage area 31 to cause the key transfer memory storage area 31 to store "0" in storage step (A) of FIG. 7 (Step S31).

Next, in storage step (B) of FIG. 7, the CPU 19 causes the entered numeral input area 25 to store "1234" received and retained (step S32). Let us assume that "1234" is determined as a numerical value that can be displayed on the display 13 (Yes in step S33).

In storage step (C) of FIG. 7, the CPU 19 causes the key transfer memory storage area 31 to store "1234" stored in the entered numeral input area 25 (step S34).

In storage step (D) of FIG. 7, the CPU 19 causes the entered numeral input area 25 and the entered numeral storage area 33 to store "1234" stored in the key transfer memory storage area 31 (step S35). Since "1234" is a numerical value determined as a numerical value that can be displayed on the display 13 (Yes in step S36), the CPU 19 proceeds to step S4, and causes the display 13 to display "1234" stored in the entered numeral input area 25. In this case, since "1234" is received data from the smartphone 50, transfer to the smartphone 50 in step S5 need not be performed, and the CPU 19 proceeds to step S1.

In storage step (E) of FIG. 7, in response to a depression of the "+" key of the key input device 11, the CPU 19 obtains the input data (step S1), and causes the operator information area 35 to store the operator "+" (step S9). At this time, the entered numeral input area 25, the entered numeral storage area 33, and the key transfer memory storage area 31 still store "1234", "1234", and "1234", respectively.

In storage step (F) of FIG. 7, in response to a depression of the "5" key of the key input device 11, the CPU 19 obtains the input data (step S1), and causes the entered numeral input area 25 to store "5" (step S7).

In storage step (G) of FIG. 7, in response to a depression of the "6" key of the key input device 11, the CPU 19 obtains the input data (step S1), and causes the entered numeral input area 25 to store "6" (step S7). Since the entered numeral input area 25 already stores "5", "56" is stored in the entered numeral input area 25.

In storage step (H) of FIG. 7, in response to a depression of the "=" key of the key input device 11, the CPU 19 obtains the input data (step S1), causes the operator information area 35 to store the operator "=", performs an arithmetic operation (here, addition) on "1234" stored in the entered numeral storage area 33 and "56" stored in the entered numeral input area 25 to obtain the arithmetic operation result "1290", and causes the entered numeral input area 25 and the entered numeral storage area 33 to store the arithmetic operation result (step S9). At this time, the key transfer memory storage area 31 still stores "1234".

A procedure for storing data in each area of the memory 21 in response to received data from the smartphone 50 and input data from the key input device 11 will be described while taking another example. Storage steps (A) to (D) in FIG. 8 are the same as storage steps (A) to (D) in FIG. 7, and descriptions thereof will be omitted. Storage steps (E) to (G) in FIG. 8 are steps for storing data in each area when the keys "5", "6", and "=" are depressed in order on the key input device 11 after the received data control processing of step S15. Namely, FIG. 8 corresponds to FIG. 7 without storage step (E).

In storage step (E) of FIG. 8, in response to a depression of the "5" key of the key input device 11, the CPU 19 obtains the input data (step S1), and causes the entered numeral input area 25 to store "5" (step S7). At this time, the entered numeral storage area 33 and the key transfer memory storage area 31 still store "1234". The operator information area 35 still stores no data.

In storage step (F) of FIG. 8, in response to a depression of the "6" key of the key input device 11, the CPU 19 obtains the input data (step S1), and causes the entered numeral input area 25 to store "6" (step S7). Since the entered numeral input area 25 already stores "5", "56" is stored in the entered numeral input area 25. At this time, the entered numeral storage area 33 and the key transfer memory storage area 31 still store "1234" and "1234", respectively. The operator information area 35 still stores no data.

In storage step (G) of FIG. 8, in response to a depression of the "=" key of the key input device 11, the CPU 19 obtains the input data (step S1), causes the operator information area 35 to store "=", and determines an entered numeral for the arithmetic operation (step S9). In this case, "56" stored in the entered numeral input area 25 is not used to perform an arithmetic operation on "1234" stored in the entered numeral storage area 33 in step S9, and the CPU 19 determines "56" stored in the entered numeral input area 25 as an entered numeral, and causes the entered numeral storage area 33 to store "56" (step S9).

As described above, the CPU 19 of the present embodiment causes the key transfer memory storage area 31 to temporarily store the value (numerical value) transferred from the smartphone 50, and then causes the entered numeral storage area 33 to store the value stored in the key transfer memory storage area 31 and causes the entered numeral input area 25 to store the same. Since the transferred value (numerical value) is stored in the entered numeral input area 25, the transferred value (numerical value) can be visually recognized on the display 13. Since the value (numerical value) transferred from the smartphone 50 is also stored in the entered numeral storage area 33, the transferred value (numerical value) is determined as an entered numeral used for the arithmetic operation performed in the calculator 10. Therefore, even when an arithmetic operation is performed on the transferred value (numerical value) in the calculator 10, a correct arithmetic operation can be performed.

When the numerical value stored in the entered numeral input area 25 by the CPU 19 is determined as a numerical value that can be displayed on the display 13, the numerical value is temporarily stored in the key transfer memory storage area 31 and then processed; therefore, the value (numerical value) transferred from the smartphone 50 can be distinguished from the value stored in the M independent memory storage area 29 or the GT independent memory storage area 27, which prevents confusion between the transferred value (numerical value) and the stored value when an arithmetic operation is performed in the calculator 10, and can make the arithmetic operation result consistent with the display content of the display 13.

When the numerical value stored in the entered numeral input area 25 by the CPU 19 is determined as a numerical value that can be displayed on the display 13, the value (numerical value) transferred from the smartphone 50 is automatically stored in the entered numeral storage area 33 and the entered numeral input area 25 without an operation of the key input device 11; accordingly, the user of the calculator 10 can concentrate on the arithmetic operation.

As described above, the CPU 19 causes the entered numeral input area 25 to temporarily store the value (numerical value) transferred from the smartphone 50. In general, the CPU 19 causes the entered numeral input area 25 to store the value input through the key input device 11. Therefore, the processing to store the transferred value (numerical value) in the entered numeral input area 25 and the processing to store the value input through the key input device 11 in the entered numeral input area 25 can be performed as common processing to store the value input into the calculator 10 in the entered numeral input area 25, and the program of the calculator 10 can be simplified, and the load on the CPU 19 during the operation can be reduced.

As described above, the CPU 19 clears the value stored in the key transfer memory storage area 31 before causing the key transfer memory storage area 31 to store the value (numerical value) transferred from the smartphone 50. Therefore, the value (numerical value) already transferred (i.e., previously transferred) from the smartphone 50 to the calculator 10 can be prevented from being used in the arithmetic operation in the calculator 10.

As described above, the CPU 19 determines whether the value stored in the entered numeral input area 25 can be displayed on the display 13, causes the key transfer memory storage area 31 to store the value stored in the entered numeral input area 25 when the display is possible, and refrains from causing the key transfer memory storage area 31 to store the value stored in the entered numeral input area 25 when the display is not possible. Therefore, of the values (numerical values) transferred from the smartphone 50, only a value that can be displayed on the display 13 can be used for the arithmetic operation. For example, when the value (numerical value) transferred from the smartphone 50 is calendar information, the value is not stored in the key transfer memory storage area 31, which prevents unnecessary processing from being performed in the calculator 10.

The processing to store the value stored in the key transfer memory storage area 31 in the entered numeral storage area 33 and the entered numeral input area 25 and the processing to store the numerical value stored in the M independent memory storage area 29 in the entered numeral input area 25 and the entered numeral storage area 33 are common processing. Consequently, the program of the calculator 10 can be simplified, and the load on the CPU 19 during the operation can be reduced.

In the above-described case, the value (numerical value) transferred from the smartphone 50 to the calculator 10 is temporarily stored in the entered numeral input area 25, and then stored in the key transfer memory storage area 31 when the numerical value stored in the entered numeral input area 25 by the CPU 19 is determined as a numerical value that can be displayed on the display 13; however, the numerical value may be directly stored in the key transfer memory storage area 31 without being stored in the entered numeral input area 25. Accordingly, the transferred value (numerical value) can be quickly stored in the key transfer memory storage area 31, and the load on the CPU 19 during the operation can be reduced.

In the above-described case, the entered numeral storage area 33 stores only one data item; however, the entered numeral storage area 33 may be divided into a plurality of areas each of which stores a data item.

Second Embodiment

Hereinafter, a second embodiment will be described. In the present embodiment, portions different from the first embodiment will be mainly described.

Figure 9:
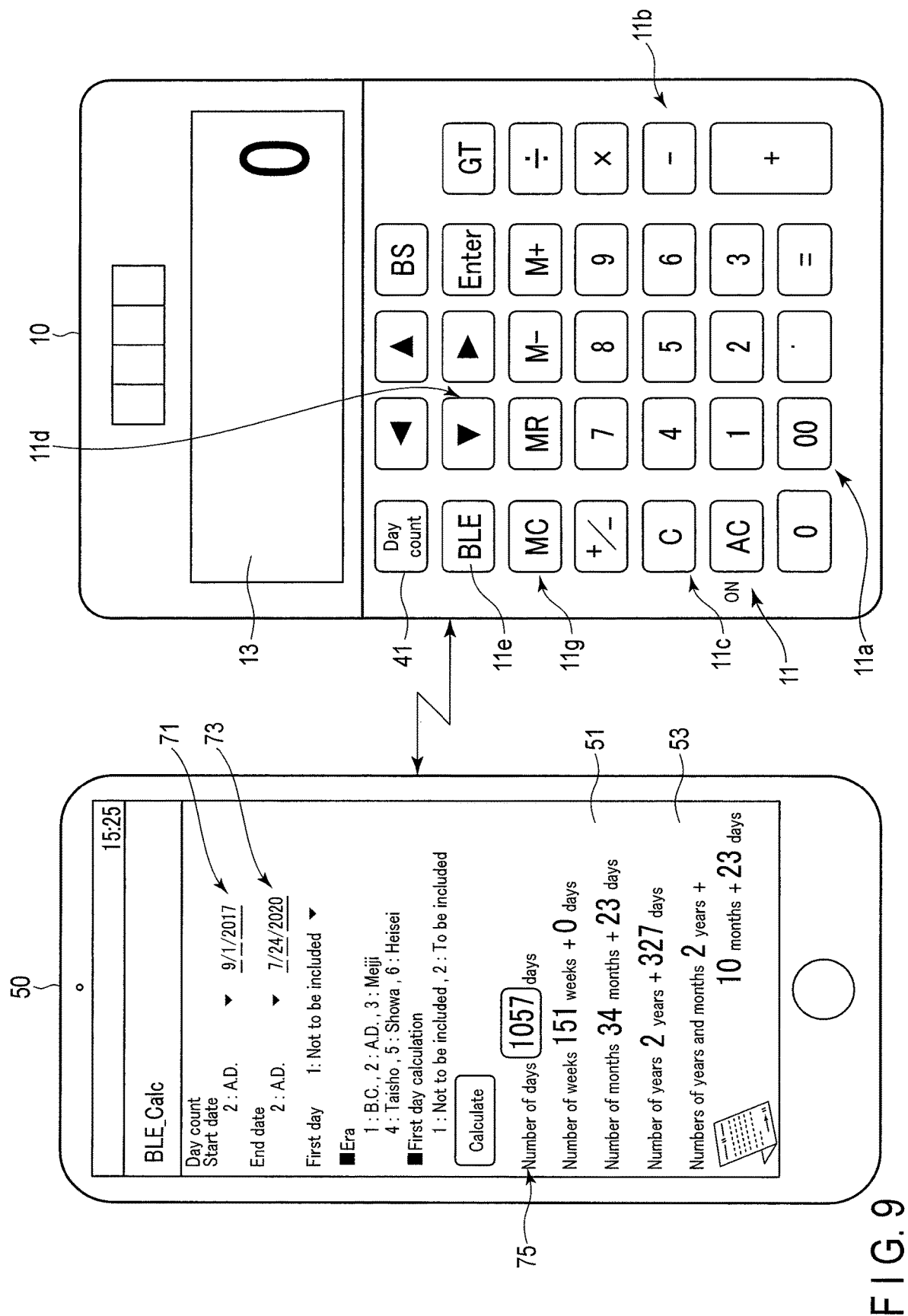
FIG. 9 is a front view showing an exterior configuration of each of a calculator as an electronic apparatus according to a second embodiment and a smartphone that performs data communication with the calculator.

FIG. 9 is a front view showing an exterior configuration of each of the calculator 10 and smartphone 50 according to the present embodiment. The present embodiment differs from the first embodiment in that the key input device 11 of the calculator 10 is further provided with a day count key 41.

A day count application is installed in the smartphone 50. When a start date 71 (e.g., Sep. 1, 2017), which is the reference date, and an end date 73 (e.g., Jul. 24, 2020) are input through the touch panel 51 or the numeric key 11a of the calculator 10 as in the first embodiment, this day count application causes the CPU 59 of the smartphone 50 to calculate the number of days 75 (1057 days) between the start date 71 and the end date 73. The CPU 59 can also calculate a result of conversion of the number of days 75 into, for example, the number of weeks (151 weeks and 0 days), the number of months (34 months+23 days), the number of years (2 years and 327 days), or the numbers of years and months (2 years +10 months +23 days). The smartphone 50 can transmit reference date data, which includes the reference date, and the calculated number of days 75 to the calculator 10. The number of days 75 transmitted to the calculator 10 is used as a value stored in the entered numeral storage area 33.

The CPU 19 of the calculator 10 according to the present embodiment can perform an arithmetic operation (addition or subtraction) on the number of days 75 received from the smartphone 50 in accordance with the input from the key input device 11, and perform a date calculation based on reference date data in response to a depression of the day count key 41 of the key input device 11.

Figure 10:
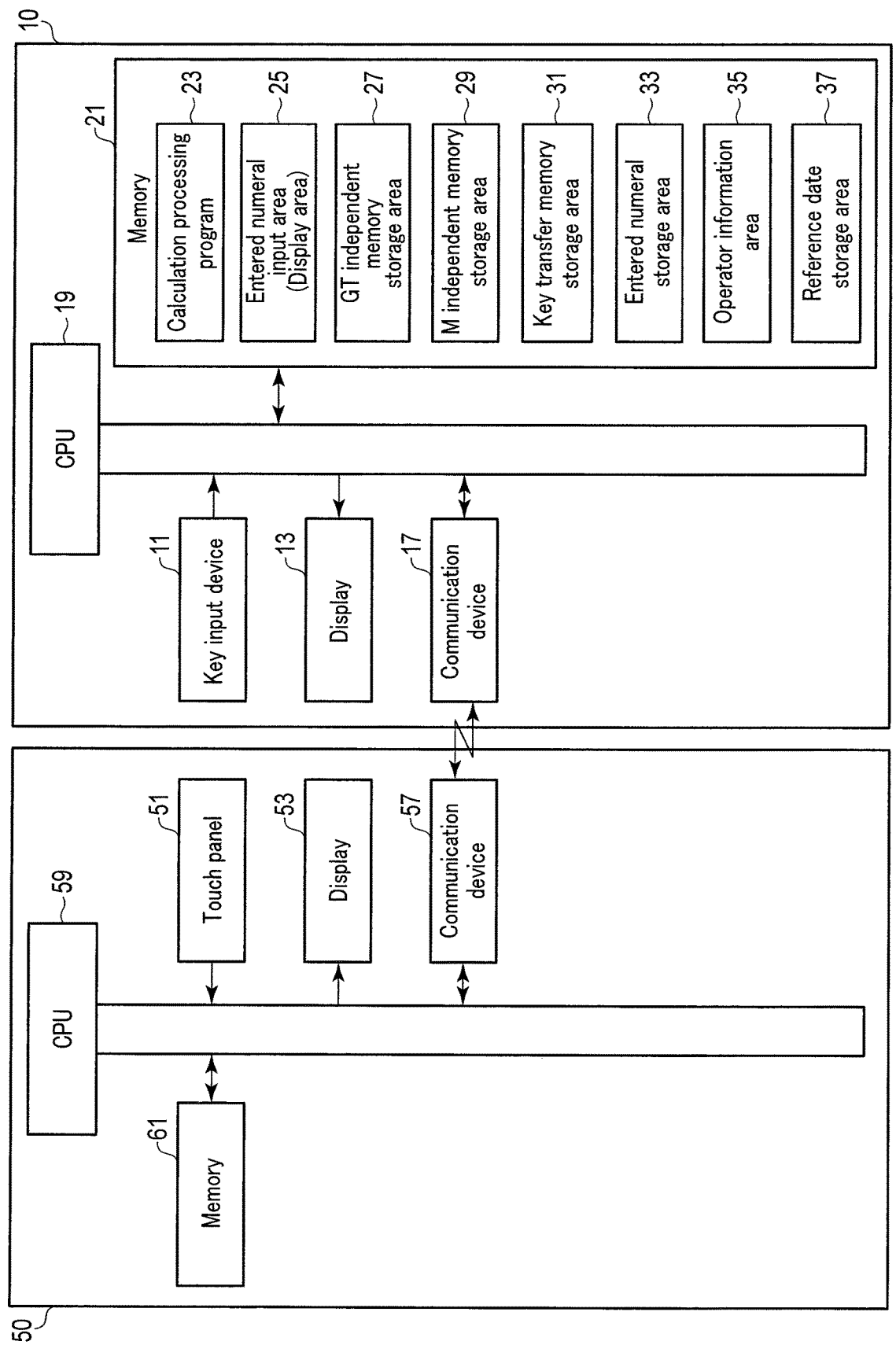
FIG. 10 is a block diagram showing a configuration of an electronic circuit of each of the calculator and smartphone shown in FIG. 9.

FIG. 10 is a block diagram showing a configuration of the electronic circuit of each of the calculator 10 and smartphone shown 50 shown in FIG. 9. The electronic circuits differ from those of the first embodiment in that the memory 21 of the calculator 10 is provided with a reference date storage area 37 for storing reference date data received from the smartphone 50. When the calculator 10 receives reference date data from the smartphone 50, the reference date storage area 37 stores the received reference date data.

Figure 11:
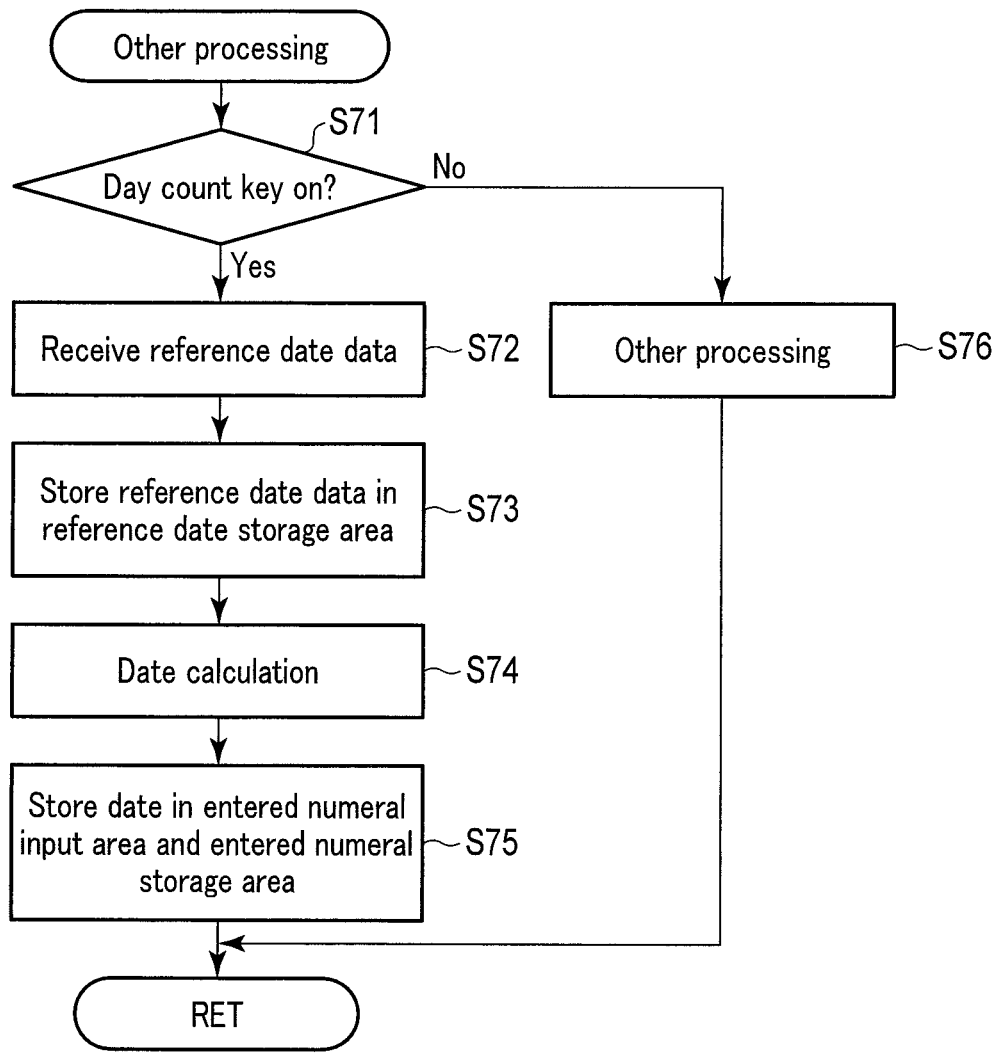
FIG. 11 is a flowchart showing date calculation processing.

FIG. 11 is a flowchart showing date calculation processing in the calculator 10 according to the present embodiment. This date calculation may be incorporated into, for example, other processing in step S16 of the first embodiment.

In step S71, the CPU 19 checks whether the day count key 41 of the key input device 11 has been depressed.

When determining that the day count key 41 has been depressed in step S71, the CPU 19 proceeds to step S72. In step S72, the CPU 19 receives reference date data from the smartphone 50. In step S73, the CPU 19 causes the reference date storage area 37 of the memory 21 to store the received reference date data. In step S74, for example, the CPU 19 performs a date calculation to add an entered numeral stored in the entered numeral storage area 33 to the reference date or subtract the entered numeral from the reference date. The result of the subtraction is a date some days before the reference date, and the result of the addition is a date some days after the reference date. In step S75, the CPU 19 causes the entered numeral input area 25 and the entered numeral storage area 33 to store the date (year, month and day) calculated by the date calculation. After that, the CPU 19 returns to step S4, thereby causing the display 13 to display the calculated year, month and day.

When determining that the day count key 41 has not been depressed in step S71, the CPU 19 proceeds to step S76. In step S76, the CPU 19 performs other processing.

A procedure for storing data in each area of the memory 21 in response to received data from the smartphone 50 and input data from the key input device 11 will be described while taking an example. In the rows of storage steps (A) to (D) in FIG. 12, data stored in the received data control processing of step S15 is shown. In the rows of storage steps (E) to (H) in FIG. 12, data stored when a subtraction is performed on the reference number of days is shown. The data stored in storage steps (A) to (H) in FIG. 12 is basically the same as that in storage steps (A) to (H) in FIG. 7; however, the receive data or input data "1234", "+", and "56" in storage steps (A) to (H) in FIG. 7 has been changed to "1057", "−", and "75" in storage steps (A) to (H) in FIG. 12. Descriptions of the stored data of storage steps (A) to (H) in FIG. 12 will be omitted because the processing performed in each step is the same as that of the first embodiment. In the rows of storage steps (I) to (J) in FIG. 12, data stored in each area when a date calculation is performed in response to the day count key 41 is shown. Hereinafter, a procedure from storage steps (I) and (J) after storage step (H) in FIG. 12 will be described.

When determining that the day count key 41 of the key input device 11 has been depressed (Yes in step S71), the CPU 19 receives reference date data indicating reference date "2017-9-1" from the smartphone 50 in storage step (I) of FIG. 12 (step S72), and causes the reference date storage area 37 to store the reference date (2017-9-1) (step S73).

Next, the CPU 19 performs a date calculation to obtain a date that is 982 days after the reference date "2017-9-1" stored in the reference date storage area 37 based on the entered numeral "982" stored in the entered numeral storage area 33 (step S74). In storage step (J) of FIG. 12, the CPU 19 causes the entered numeral input area 25 and the entered numeral storage area 33 to store "2020-5-10" obtained as a result of the date calculation (step S75).

As described above, the CPU 19 of the present embodiment performs a date calculation (addition or subtraction) based on the entered numeral stored in the entered numeral storage area 33 and the reference date, and causes the entered numeral input area 25 and the entered numeral storage area 33 to store the calculated date. Since the value (numerical value) transferred from the smartphone 50 to the calculator 10 is stored in the entered numeral storage area 33, the transferred value (numerical value) is determined as an entered numeral used for the arithmetic operation performed in the calculator 10. Therefore, even when an arithmetic operation is performed on the transferred value (numerical value) and a date calculation is further performed on the arithmetic operation result, the calculator 10 can perform a correct date calculation.

The present invention is not limited to the above-described embodiments, and can be modified in practice, without departing from the gist of the invention. In addition, embodiments may be combined as appropriate, in which case a combined effect is obtained. Furthermore, the above-described embodiments include various inventions, and various inventions can be extracted by a combination of structural elements selected from a plurality of disclosed structural elements. For example, even if some structures of all the structures disclosed in an embodiment are deleted, the embodiment from which those structures are deleted can be extracted as an invention as long as the problem to be solved by the invention can be solved, and the effect of the invention can be obtained.

The invention claimed is:

1. An electronic apparatus comprising:
a key input device comprising a plurality of input keys;
a memory configured to secure therein, at least:
  a key transfer memory storage area;
  an entered numeral storage area;
  an entered numeral input area; and
  an operator information area; and
a processor configured to:
  clear a value stored in the key transfer memory storage area;
  cause the entered numeral input area to store a first numerical value transferred from an external device;
  after causing the entered numeral input area to store the first numerical value transferred from the external device, determine whether a display can display the first numerical value stored in the entered numeral input area;
  in response to determining that the display cannot display the first numerical value stored in the entered numeral input area, refrain from causing the key transfer memory storage area to store the first numerical value stored in the entered numeral input area; and
  in response to determining that the display can display the first numerical value stored in the entered numeral input area:
    cause the key transfer memory storage area to store the first numerical value;
    then cause the entered numeral storage area and the entered numeral input area to store the first numerical value stored in the key transfer memory storage area;
    then cause a second numerical value input through the key input device to be stored in the entered numeral input area instead of the first numerical value, while the first numerical value continues to be stored in the entered numeral storage area and the key transfer memory storage area;
    in response to a first operator of a first type being input through the key input device after transfer of the first numerical value from the external device and prior to the input of the second numerical value input through the key input device, cause the operator information area to store the first operator; and
    in response to a second operator of a second type being input through the key input device after the second numerical value is stored in the entered numeral input area while the first numerical value continues to be stored in the entered numeral storage area and the key transfer memory storage area and after the first operator is stored in the operator information area,
      perform an arithmetic operation defined by the first operator of the first type on the first numerical value stored in the entered numeral storage area and the second numeral stored in the entered numeral input area; and
      then cause the entered numeral storage area to store a result of the arithmetic operation instead of the first numerical value and the entered numeral input area to store the result of the arithmetic operation instead of the second numerical value,
wherein the memory is further configured to secure therein an independent memory storage area,
wherein the processor is further configured to:
  in response to an input through a memory storage key of the key input device, cause the independent memory storage area to store a numerical value obtained by processing the numerical value stored in the entered numeral input area; and in response to an input from a memory read key of the key input device, cause the entered numeral input area and the entered numeral storage area to store the numerical value stored in the independent memory storage area, and wherein processing to cause the entered numeral input area and the entered numeral storage area to store the value stored in the key transfer memory storage area and processing to cause the entered numeral input area and the entered numeral storage area to store the numerical value stored in the independent memory storage area are common processing.

2. The electronic apparatus according to claim 1, wherein the processor is configured to cause a display to display the first numerical value stored in the entered numeral input area.

3. The electronic apparatus according to claim 1, wherein the memory is further configured to secure therein a reference date storage area, and
wherein the processor is further configured to:
 calculate a date based on a reference date stored in the reference date storage area and the entered numeral; and
 cause the entered numeral input area and the entered numeral storage area to store the date calculated.

4. The electronic apparatus according to claim 1, wherein the input key is a hardware key.

5. The electronic apparatus according to claim 1, wherein the external device is a smart device.

6. The electronic apparatus according to claim 1, wherein the key input device comprises a first key for inputting an operator for use in an arithmetic operation, and a second key for triggering execution of the arithmetic operation using the operator, and
wherein the processor is configured to:
 cause, in response to determining that the first numerical value is received from the external device before the operator is input through the first key, the entered numeral storage area to store the first numerical value before the operator is input;
 cause, in response to determining that the second numerical value is received from the external device after the operator is input through the first key, the entered numeral input area to store the second numerical value before the execution of the arithmetic operation is triggered through the second key; and
 perform, in response to determining that the execution of the arithmetic operation is triggered through the second key, the arithmetic operation using the operator input through the first key, the first numerical value stored in the entered numeral storage area, and the second numerical value stored in the entered numeral input area.

7. A method performed by a processor of an electronic apparatus, the method comprising:
 clearing a value stored in a key transfer memory storage area;
 causing an entered numeral input area of a memory to store a first numerical value transferred from an external device;
 after causing the entered numeral input area to store the first numerical value transferred from the external device, determining whether a display can display the first numerical value stored in the entered numeral input area;
 in response to determining that the display cannot display the first numerical value stored in the entered numeral input area, refraining from causing the key transfer memory storage area to store the first numerical value stored in the entered numeral input area; and
 in response to determining that the display can display the first numerical value stored in the entered numeral input area:
  causing the key transfer memory storage area of the memory to store the first numerical value;
  then causing an entered numeral storage area of the memory and the entered numeral input area to store the first numerical value stored in the key transfer memory storage area;
  then causing a second numerical value input through a key input device comprising a plurality of input keys to be stored in the entered numeral input area instead of the first numerical value, while the first numerical value continues to be stored in the entered numeral storage area and the key transfer memory storage area;
 in response to a first operator of a first type being input through the key input device after transfer of the first numerical value from the external device and prior to the input of the second numerical value input through the key input device, causing an operator information area to store the first operator; and
 in response to a second operator of a second type being input through the key input device after the second numerical value is stored in the entered numeral input area while the first numerical value continues to be stored in the entered numeral storage area and the key transfer memory storage area and after the first operator is stored in the operator information area,
  performing an arithmetic operation defined by the first operator of the first type on the first numerical value stored in the entered numeral storage area and the second numeral stored in the entered numeral input area; and
  then causing the entered numeral storage area to store a result of the arithmetic operation instead of the first numerical value and the entered numeral input area to store the result of the arithmetic operation instead of the second numerical value
wherein the memory is further configured to secure therein an independent memory storage area,
wherein the method further comprises:
 in response to an input through a memory storage key of the key input device, causing the independent memory storage area to store a numerical value obtained by processing the numerical value stored in the entered numeral input area; and
 in response to an input from a memory read key of the key input device, causing the entered numeral input area and the entered numeral storage area to store the numerical value stored in the independent memory storage area, and
wherein processing to cause the entered numeral input area and the entered numeral storage area to store the value stored in the key transfer memory storage area and processing to cause the entered numeral input area and the entered numeral storage area to store the numerical value stored in the independent memory storage area are common processing.

8. A non-transitory computer-readable recording medium with an executable program stored thereon, wherein the program instructs a computer to:
clear a value stored in a key transfer memory storage area;
cause an entered numeral input area of a memory to store a first numerical value transferred from an external device;
after causing the entered numeral input area to store the first numerical value transferred from the external device, determine whether a display can display the first numerical value stored in the entered numeral input area;
in response to determining that the display cannot display the first numerical value stored in the entered numeral input area, refrain from causing the key transfer memory storage area to store the first numerical value stored in the entered numeral input area; and
in response to determining that the display can display the first numerical value stored in the entered numeral input area:
cause the key transfer memory storage area of the memory to store the first numerical value;
then cause an entered numeral storage area of the memory and the entered numeral input area to store the first numerical value stored in the key transfer memory storage area;
then cause a second numerical value input through a key input device comprising a plurality of input keys to be stored in the entered numeral input area instead of the first numerical value, while the first numerical value continues to be stored in the entered numeral storage area and the key transfer memory storage area;
in response to a first operator of a first type being input through the key input device after transfer of the first numerical value from the external device and prior to the input of the second numerical value input through the key input device, cause an operator information area to store the first operator; and
in response to a second operator of a second type being input through the key input device after the second numerical value is stored in the entered numeral input area while the first numerical value continues to be stored in the entered numeral storage area and the key transfer memory storage area and after the first operator is stored in the operator information area,
perform an arithmetic operation defined by the first operator of the first type on the first numerical value stored in the entered numeral storage area and the second numeral stored in the entered numeral input area; and
then cause the entered numeral storage area to store a result of the arithmetic operation instead of the first numerical value and the entered numeral input area to store the result of the arithmetic operation instead of the second numerical value,
wherein the memory is further configured to secure therein an independent memory storage area,
wherein the program further instructs the computer to:
in response to an input through a memory storage key of the key input device, cause the independent memory storage area to store a numerical value obtained by processing the numerical value stored in the entered numeral input area; and
in response to an input from a memory read key of the key input device, cause the entered numeral input area and the entered numeral storage area to store the numerical value stored in the independent memory storage area, and
wherein processing to cause the entered numeral input area and the entered numeral storage area to store the value stored in the key transfer memory storage area and processing to cause the entered numeral input area and the entered numeral storage area to store the numerical value stored in the independent memory storage area are common processing.

9. An electronic apparatus comprising:
a key input device comprising a plurality of input keys;
a memory configured to secure therein, at least:
a key transfer memory storage area;
an entered numeral storage area;
an entered numeral input area; and
an operator information area; and
a processor configured to:
cause the entered numeral input area to store a first numerical value transferred from an external device;
then cause the key transfer memory storage area to store the first numerical value;
then cause the entered numeral storage area and the entered numeral input area to store the first numerical value stored in the key transfer memory storage area;
then cause a second numerical value input through the key input device to be stored in the entered numeral input area instead of the first numerical value, while the first numerical value continues to be stored in the entered numeral storage area and the key transfer memory storage area;
in response to a first operator of a first type being input through the key input device after transfer of the first numerical value from the external device and prior to the input of the second numerical value input through the key input device, cause the operator information area to store the first operator; and
in response to a second operator of a second type being input through the key input device after the second numerical value is stored in the entered numeral input area while the first numerical value continues to be stored in the entered numeral storage area and the key transfer memory storage area and after the first operator is stored in the operator information area,
perform an arithmetic operation defined by the first operator of the first type on the first numerical value stored in the entered numeral storage area and the second numeral stored in the entered numeral input area; and
then cause the entered numeral storage area to store a result of the arithmetic operation instead of the first numerical value and the entered numeral input area to store the result of the arithmetic operation instead of the second numerical value,
wherein the memory is further configured to secure therein an independent memory storage area,
wherein the processor is further configured to:
in response to an input through a memory storage key of the key input device, cause the independent memory storage area to store a numerical value obtained by processing the numerical value stored in the entered numeral input area; and in response to an input from a memory read key of the key input device, cause the entered numeral input area and the entered numeral storage area to store the numerical value stored in the independent memory storage area, and wherein processing to cause the entered numeral input area and the entered numeral storage area to store the value stored in the key transfer memory storage area and processing to cause the entered numeral input area and the entered numeral storage area to store the numerical value stored in the independent memory storage area are common processing, wherein the key input device comprises a first key for inputting an operator for use in an arithmetic operation, and a second key for triggering execution of the arithmetic operation using the operator, and wherein the processor is configured to:

cause, in response to determining that the first numerical value is received from the external device before the operator is input through the first key, the entered numeral storage area to store the first numerical value before the operator is input;

cause, in response to determining that the second numerical value is received from the external device after the operator is input through the first key, the entered numeral input area to store the second numerical value before the execution of the arithmetic operation is triggered through the second key; and perform, in response to determining that the execution of the arithmetic operation is triggered through the second key, the arithmetic operation using the operator input through the first key, the first numerical value stored in the entered numeral storage area, and the second numerical value stored in the entered numeral input area.

* * * * *